United States Patent
Hsu et al.

(10) Patent No.: US 8,509,423 B2
(45) Date of Patent: Aug. 13, 2013

(54) SYNCHRONOUS PULL DEVICE FOR SLIDE COVER MECHANISM

(75) Inventors: An Szu Hsu, New Taipei (TW); Yung Sheng Kuo, New Taipei (TW)

(73) Assignee: First Dome Corporation, New Taipei (TW)

( * ) Notice: Subject to any disclaimer, the term of this patent is extended or adjusted under 35 U.S.C. 154(b) by 280 days.

(21) Appl. No.: 13/102,259

(22) Filed: May 6, 2011

(65) Prior Publication Data

US 2012/0279137 A1 Nov. 8, 2012

(51) Int. Cl.
*H04M 1/00* (2006.01)
*H04M 9/00* (2006.01)

(52) U.S. Cl.
USPC .................................. 379/433.12; 455/575.4

(58) Field of Classification Search
USPC ............ 379/433.12; 455/575.4; 361/679.39, 361/679.27, 679.13, 679.56; 16/345, 352, 16/353, 362, 367
See application file for complete search history.

(56) References Cited

U.S. PATENT DOCUMENTS

| | | | |
|---|---|---|---|
| 2009/0149230 A1* | 6/2009 | Ruan | 455/575.4 |
| 2009/0168339 A1* | 7/2009 | Lee | 361/679.56 |
| 2010/0234080 A1* | 9/2010 | Holman et al. | 455/575.4 |
| 2012/0238332 A1* | 9/2012 | Mai et al. | 455/575.4 |

* cited by examiner

*Primary Examiner* — Tuan D Nguyen
(74) *Attorney, Agent, or Firm* — Rosenberg, Klein & Lee

(57) ABSTRACT

A synchronous pull device for slide cover mechanism includes two guide members, two slide seats and two pull assemblies. Slide guide sections are disposed on each guide member, whereby the slide seats can slide along the slide guide sections. First connection ends and second connection ends are respectively disposed on opposite sides of the slide seats. Each pull assembly includes at least two idlers, a middle idler and a pull cord. The two idlers are positioned beside two different ends of two different slide guide sections on opposite sides of the two guide members. The middle idlers are disposed between the two guide members near two ends of the slide guide sections. Each pull cord sequentially goes from the first connection end of one of the slide seats through one idler, the middle idler and the other idler to connect with the second connection end of the other slide seat.

29 Claims, 3 Drawing Sheets

SYNCHRONOUS PULL DEVICE FOR SLIDE COVER MECHANISM

BACKGROUND OF THE INVENTION

1. Field of the Invention

The present invention relates generally to asynchronous pull device for slide cover mechanism, and more particularly to a pull device for slide cover mechanism, which is able to provide stable driving force for the slide cover. With the synchronous pull device, the slide cover can be stably operated without deflection.

2. Description of the Related Art

Various slide cover structures have been developed and applied to different electronic devices to catch up the trend of product design and protect the panels of the electronic devices. For example, Taiwanese Patent Publication No. M392525 discloses a slide cover assembly and a slide cover electronic device. The slide cover assembly is disposed between the cover body and the main body of the electronic device. The slide cover assembly includes a support board connected with the cover body and a link board connected with the main body. A slide block is disposed in the support board. A torque spring assembly and an elastic member serve to apply a force to the slide block to slide the slide block. The slide block is connected with the link board via connection strings wound on locating poles of the support board. By means of the connection strings, the link board and the slide block always move relative to each other in reverse directions. The flat cable of the electronic device is conducted through the slide block and drivable by the slide block.

Taiwanese Patent Publication No. I280031 discloses a slide cover device including a substrate with a guide channel and slide rail. The guide channel is formed with a curved path having an overpass point. The slide cover device further includes an upper cover formed with elongated slots and inlaid in the slide rail. The slide cover device further includes elastic members positioned at the elongated slots. The elastic members include two springs and rolling members. The fixed ends of the springs are respectively fixed at the outer ends of the elongated slots. The rolling members are respectively connected with the free ends of the springs, which free ends extend in the elongated slots. When the upper cover is moved, the rolling members move along the guide channel to drivingly compress/decompress the springs. When the rolling members pass over the overpass point, the elastic members will pull the upper cover to automatically extend or retract the upper cover relative to the substrate.

Taiwanese Patent Publication No. I328088 discloses a slide module and a portable electronic device adopting the slide module. The slide module includes a fixed system and a movable system. A fixed frame is fixedly connected to the fixed system and a movable frame is fixedly connected to the movable system. Two reverse hook sections are disposed on two sides of the fixed frame. The lateral edges of the movable frame are fitted and received in the reverse hook sections, whereby the movable system can be moved relative to the fixed system between a first position and a second position. Linear torque springs are used to provide necessary driving force for the movable system.

In the above structure, coil springs or linear metal torque springs are used to provide necessary driving force for the slide cover. Such structure is practically applicable to small-size electronic products with small-volume and lightweight slide cover, such as cellular phones, handheld game machines and personal digital assistants (PDA). However, such structure can be hardly applied to a large-size electronic product such as a laptop computer or a tablet computer. This is because the movable system will have a heavier weight and it is necessary to move the movable system through a longer distance. When applying a push force to one single side of the movable system, the movable system is very likely to be biased. This will affect the smoothness of the sliding movement of the movable system. In some more serious cases, the movable system may be stuck with no possibility of moving. Moreover, it is hard to assemble the elastic members with the driven components. Also, elastic fatigue of the elastic members tends to take place after a period of use. This will lead to unsmooth operation of the slide cover.

SUMMARY OF THE INVENTION

It is therefore a primary object of the present invention to provide a synchronous pull device for slide cover mechanism. With the synchronous pull device, the slide cover can still stably and smoothly slide without deflection even under one-side lateral push force.

It is a further object of the present invention to provide the above synchronous pull device for slide cover mechanism, which has a simplified structure and is easy to assemble. Therefore, the manufacturing cost of the slide cover is lowered to promote the competitive ability of the product.

To achieve the above and other objects, the synchronous pull device for slide cover mechanism of the present invention includes: two guide members, which are side by side arranged opposite to each other, at least one slide guide section being disposed on each of the guide members; two slide seats respectively connected with the guide members and slidable along the slide guide sections of the guide members, first connection ends and second connection ends being respectively correspondingly disposed on opposite sides of the slide seats; and two pull assemblies each includes at least two idlers and a pull cord. The two idlers are positioned beside two different ends of the slide guide sections on opposite sides of the two guide members. The pull cords sequentially go from the first connection end of one of the slide seats through two idlers to connect with the second connection end of the other slide seat.

In the above synchronous pull device for slide cover mechanism, the pull assembly further includes at least one middle idler disposed between the two guide members. The middle idler is positioned near an end section of the slide guide section.

In the above synchronous pull device for slide cover mechanism, each guide member has two slide guide sections respectively disposed on two sides of the guide member in parallel to each other. The slide seats are relatively slidably connected with the slide guide sections.

In the above synchronous pull device for slide cover mechanism, each slide seat has two slide jacket sections respectively disposed on two sides of the slide seat. The slide jacket sections are slidably fitted with the slide guide sections.

The present invention can be best understood through the following description and accompanying drawings, wherein:

DETAILED DESCRIPTION OF THE PREFERRED EMBODIMENTS

Figure 1:
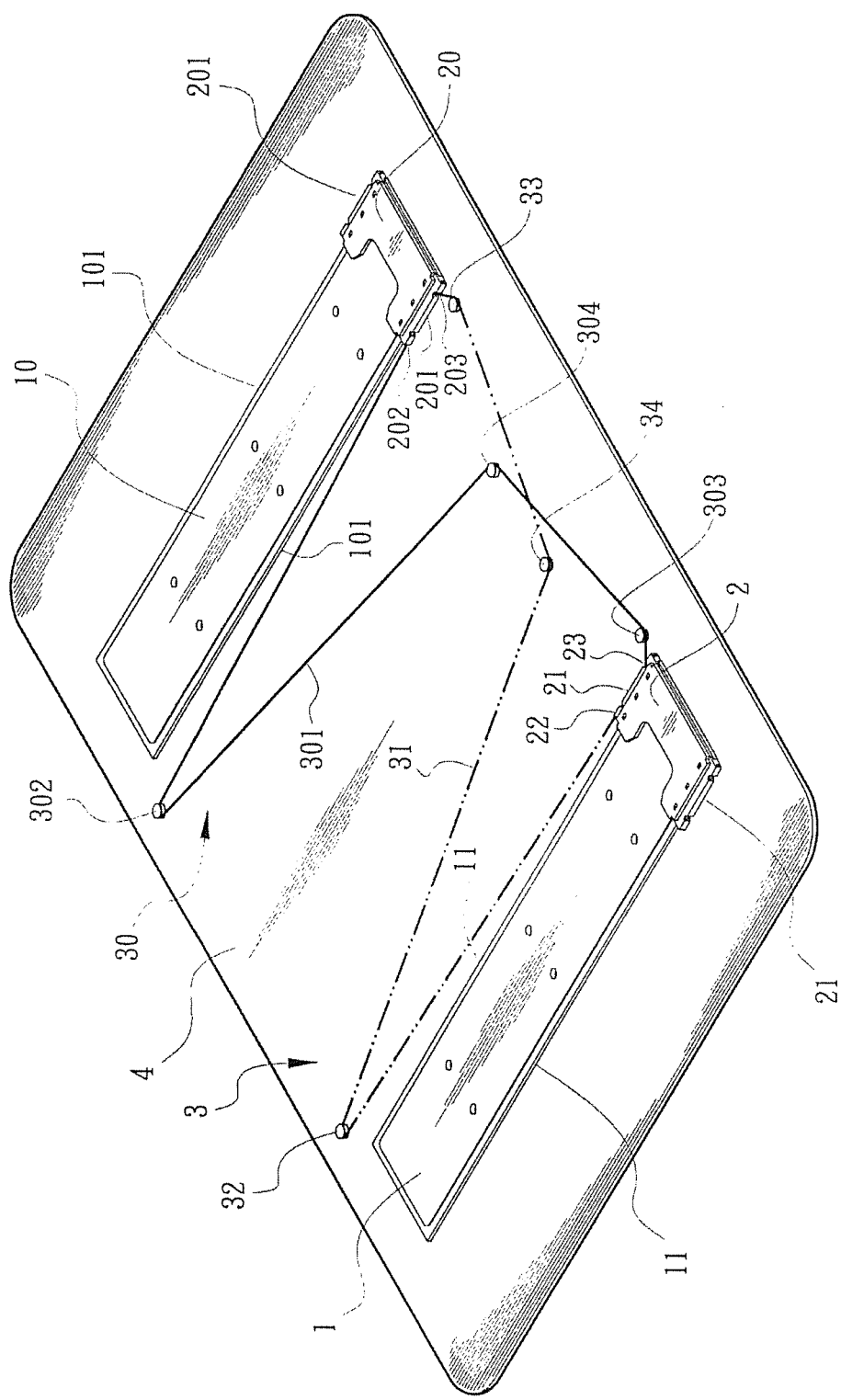
FIG. 1 is a perspective view of the present invention.
Figure 2:
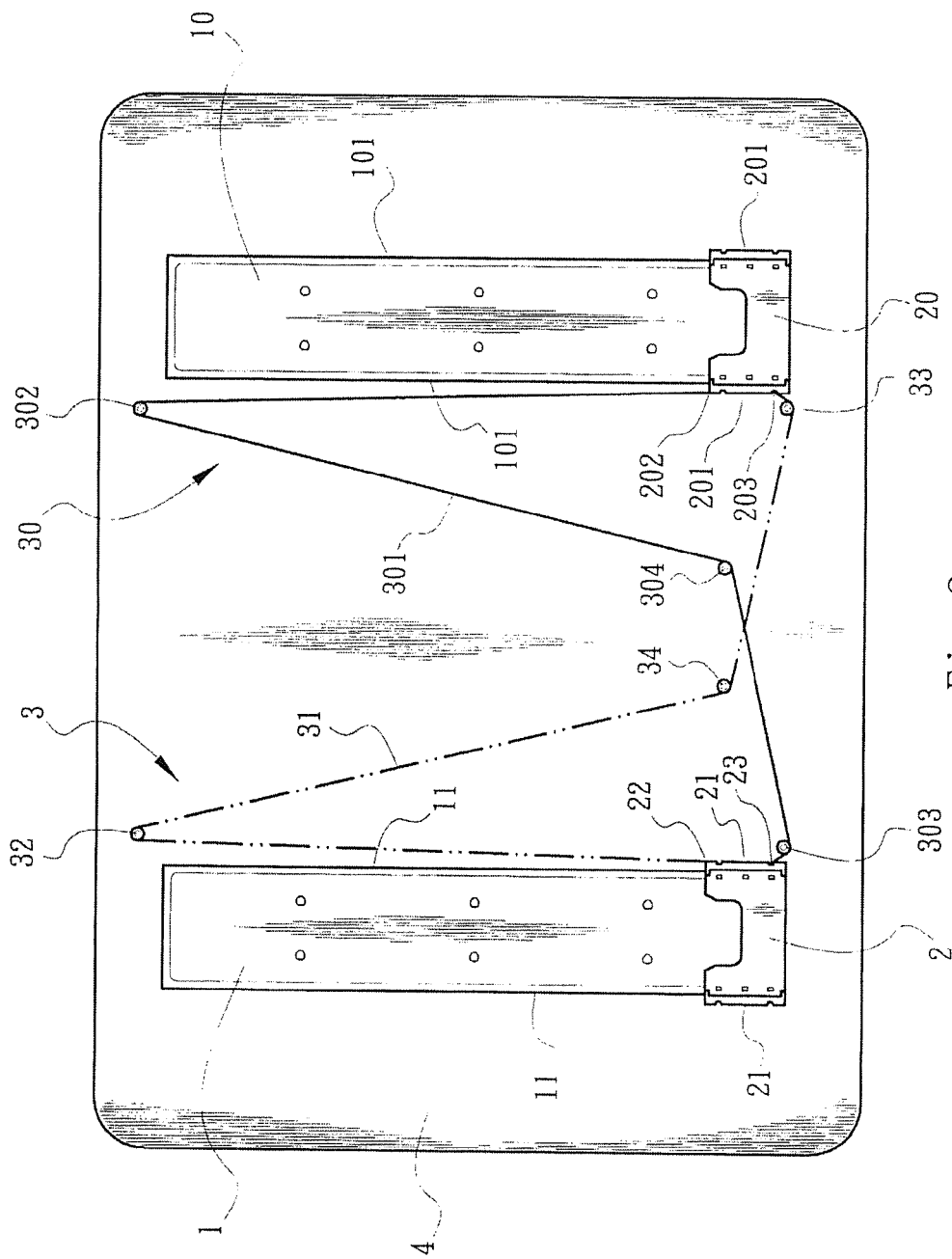
FIG. 2 is a plane view showing the operation of the present invention in one state.
Figure 3:
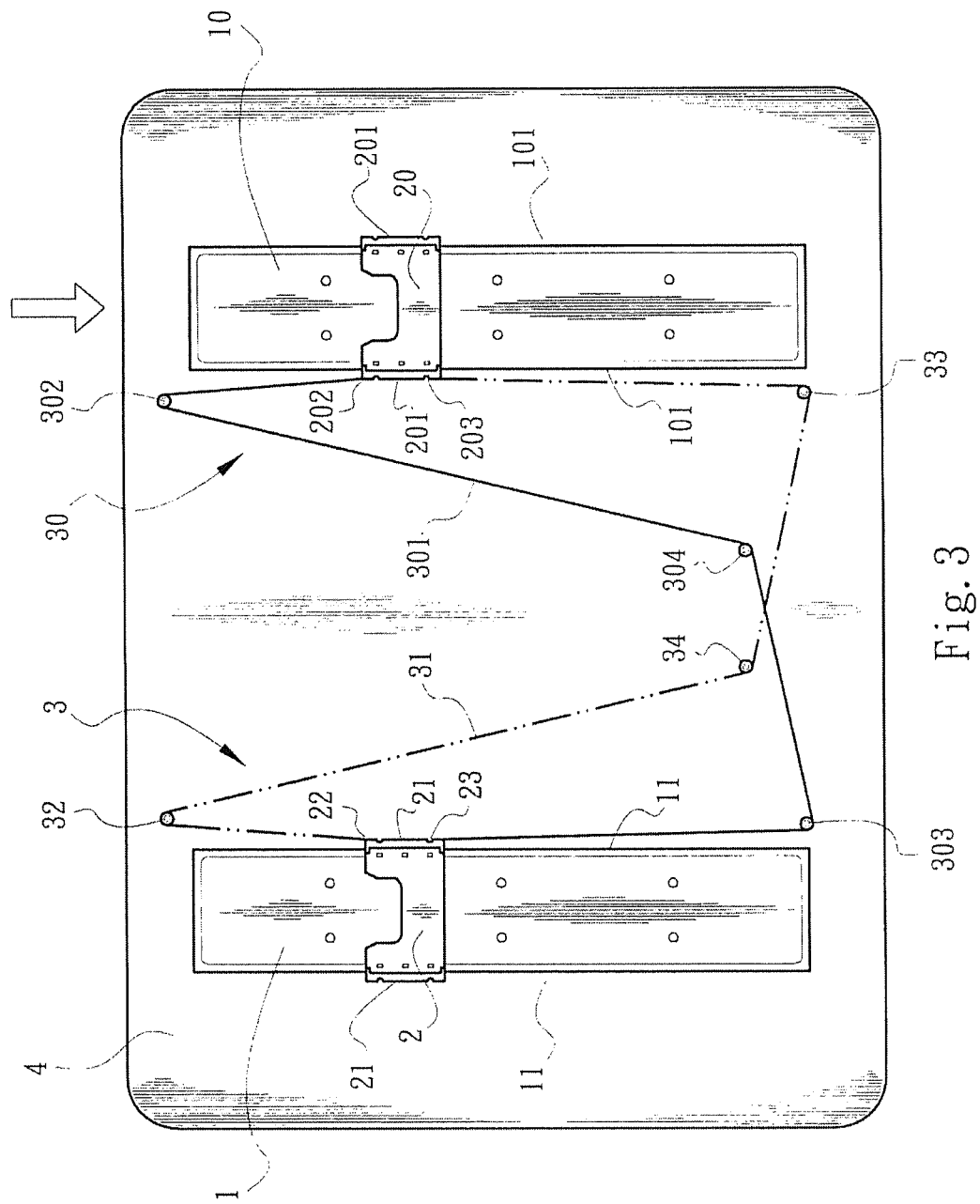
FIG. 3 is a plane view showing the operation of the present invention in another state.

Please refer to FIGS. 1 to 3. The present invention includes two guide members 1, 10, two slide seats 2, 20 and two pull assemblies 3, 30. The guide members 1, 10 are oppositely side by side arranged on a base seat 4 (preferably in parallel to each other). The base seat 4 is connectable with a slide member (such as a slide cover). In practice, the guide members 1, 10 can be directly disposed on the slide member. At least one slide guide section 11, 101 is disposed on each of the guide members 1, 10. Preferably, each of the guide members 1, 10 has two slide guide sections 11, 101 on two sides. The slide seats 2, 20 are formed or arranged on a relative slide member (such as a main body of an electronic device). At least one low-friction slide jacket section 21, 201 is disposed on one side of each of the slide seats 2, 20. Preferably, each of the slide seats 2, 20 has two slide jacket sections 21, 201 on two sides. The slide jacket sections 21, 201 are slidably connected with the slide guide sections 11, 101 of the guide members 1, 10, whereby the slide seats 2, 20 can slide along the slide guide sections 11, 101. In addition, first connection ends 22, 202 and second connection ends 23, 203 are respectively correspondingly disposed on opposite sides of the slide seats 2, 20. Each pull assembly 3, 30 includes a first idler 32, 302, a second idler 33, 303, a middle idler 34, 304 and a pull cord 31, 301. The first idler 32 of the pull assembly 3 and the second idler 303 of the pull assembly 30 are positioned beside the slide guide section 11 on one side of the guide member 1, which side is proximal to the guide member 10, preferably near two ends of the slide guide section 11. The first idler 302 of the pull assembly 30 and the second idler 33 of the pull assembly 3 are positioned beside the slide guide section 101 on one side of the guide member 10, which side is proximal to the guide member 1, preferably near two ends of the slide guide section 101. The pull cord 31 sequentially goes from the first connection end 22 of the slide seat 2 through the first idler 32, the middle idler 34 and the second idler 33 to connect with the second connection end 203 of the other slide seat 20. The pull cord 301 sequentially goes from the first connection end 202 of the slide seat 20 through the first idler 302, the middle idler 304 and the second idler 303 to connect with the second connection end 23 of the other slide seat 2.

In operation, in the case that the slide seats 2, 20 are initially positioned at one end of the slide guide sections 11, 101 of the guide members 1, 10 (as shown in FIG. 2), when a force is applied to at least one of the slide seats 2, 20 to make the slide seats 2, 20 move toward the other end of the slide guide sections 11, 101 (as shown in FIG. 3), the slide seat 2 releases the pull cord 31 via the first connection end 22 and pulls the pull cord 301 via the second connection end 23 for driving the slide seat 20 to start sliding. The releasing length of the pull cord 31 is approximately equal to the pulling length of the pull cord 301. Accordingly, the slide seat 20 is synchronously slid with the slide seat 2. Similarly, when the slide seats 2, 20 are slid in a reverse direction, the slide seat 2 can pull the pull cord 31 via the first connection end 22 and release the pull cord 301 via the second connection end 23. In this case, the slide seat 20 is also driven to synchronously slide with the slide seat 2.

According to the above arrangement, the slide seats 2, 20 are respectively arranged on the guide members 1, 10 to avoid deflection due to lateral force. Also, the present invention has a simplified structure and is easy to assemble so that the manufacturing cost is lowered. In addition, in use, the present invention is not subject to wear so that the possibility of malfunction is minimized. Accordingly, the quality of the product can be ensured to promote the competitive ability of the product.

The above embodiments are only used to illustrate the present invention, not intended to limit the scope thereof. Many modifications of the above embodiments can be made without departing from the spirit of the present invention.

What is claimed is:

1. A synchronous pull device for slide cover mechanism, comprising:
    two guide members, which are side by side arranged opposite to each other, at least one slide guide section being disposed on each of the guide members;
    two slide seats respectively connected with the guide members and slidable along the slide guide sections of the guide members, first connection ends and second connection ends being respectively correspondingly disposed on opposite sides of the slide seats; and
    two pull assemblies each includes at least two idlers and a pull cord, the two idlers being positioned beside two different ends of the slide guide sections on opposite sides of the two guide members, the pull cord sequentially going from the first connection end of one of the slide seats through two idlers in the opposite angles to connect with the second connection end of the other slide seat.

2. The synchronous pull device for slide cover mechanism as claimed in claim 1, wherein the pull assembly further includes at least one middle idler disposed between the two guide members, the middle idler being positioned on one side of a diagonal line of the opposite angles.

3. The synchronous pull device for slide cover mechanism as claimed in claim 2, wherein the middle idler is positioned near an end section of the slide guide section.

4. The synchronous pull device for slide cover mechanism as claimed in claim 1, wherein the guide members are arranged on abase seat in parallel to each other.

5. The synchronous pull device for slide cover mechanism as claimed in claim 2, wherein the guide members are arranged on a base seat in parallel to each other.

6. The synchronous pull device for slide cover mechanism as claimed in claim 3, wherein the guide members are arranged on a base seat in parallel to each other.

7. The synchronous pull device for slide cover mechanism as claimed in claim 4, wherein the guide members are integrally formed on the base seat.

8. The synchronous pull device for slide cover mechanism as claimed in claim 5, wherein the guide members are integrally formed on the base seat.

9. The synchronous pull device for slide cover mechanism as claimed in claim 1, wherein the slide seats are disposed on a relative slide member, which is slidable relative to the guide members.

10. The synchronous pull device for slide cover mechanism as claimed in claim 2, wherein the slide seats are disposed on a relative slide member, which is slidable relative to the guide members.

11. The synchronous pull device for slide cover mechanism as claimed in claim 3, wherein the slide seats are disposed on a relative slide member, which is slidable relative to the guide members.

12. The synchronous pull device for slide cover mechanism as claimed in claim 9, wherein the slide seats are integrally formed on the relative slide member.

13. The synchronous pull device for slide cover mechanism as claimed in claim 10, wherein the slide seats are integrally formed on the relative slide member.

14. The synchronous pull device for slide cover mechanism as claimed in claim 1, wherein each guide member has two slide guide sections respectively disposed on two sides of the guide member in parallel to each other, the slide seats being relatively slidably connected with the slide guide sections.

15. The synchronous pull device for slide cover mechanism as claimed in claim 2, wherein each guide member has two slide guide sections respectively disposed on two sides of the guide member in parallel to each other, the slide seats being relatively slidably connected with the slide guide sections.

16. The synchronous pull device for slide cover mechanism as claimed in claim 3, wherein each guide member has two slide guide sections respectively disposed on two sides of the guide member in parallel to each other, the slide seats being relatively slidably connected with the slide guide sections.

17. The synchronous pull device for slide cover mechanism as claimed in claim 4, wherein each guide member has two slide guide sections respectively disposed on two sides of the guide member in parallel to each other, the slide seats being relatively slidably connected with the slide guide sections.

18. The synchronous pull device for slide cover mechanism as claimed in claim 7, wherein each guide member has two slide guide sections respectively disposed on two sides of the guide member in parallel to each other, the slide seats being relatively slidably connected with the slide guide sections.

19. The synchronous pull device for slide cover mechanism as claimed in claim 9, wherein each guide member has two slide guide sections respectively disposed on two sides of the guide member in parallel to each other, the slide seats being relatively slidably connected with the slide guide sections.

20. The synchronous pull device for slide cover mechanism as claimed in claim 10, wherein each guide member has two slide guide sections respectively disposed on two sides of the guide member in parallel to each other, the slide seats being relatively slidably connected with the slide guide sections.

21. The synchronous pull device for slide cover mechanism as claimed in claim 12, wherein each guide member has two slide guide sections respectively disposed on two sides of the guide member in parallel to each other, the slide seats being relatively slidably connected with the slide guide sections.

22. The synchronous pull device for slide cover mechanism as claimed in claim 14, wherein each slide seat has two slide jacket sections respectively disposed on two sides of the slide seat, the slide jacket sections being slidably fitted with the slide guide sections.

23. The synchronous pull device for slide cover mechanism as claimed in claim 15, wherein each slide seat has two slide jacket sections respectively disposed on two sides of the slide seat, the slide jacket sections being slidably fitted with the slide guide sections.

24. The synchronous pull device for slide cover mechanism as claimed in claim 16, wherein each slide seat has two slide jacket sections respectively disposed on two sides of the slide seat, the slide jacket sections being slidably fitted with the slide guide sections.

25. The synchronous pull device for slide cover mechanism as claimed in claim 17, wherein each slide seat has two slide jacket sections respectively disposed on two sides of the slide seat, the slide jacket sections being slidably fitted with the slide guide sections.

26. The synchronous pull device for slide cover mechanism as claimed in claim 18, wherein each slide seat has two slide jacket sections respectively disposed on two sides of the slide seat, the slide jacket sections being slidably fitted with the slide guide sections.

27. The synchronous pull device for slide cover mechanism as claimed in claim 19, wherein each slide seat has two slide jacket sections respectively disposed on two sides of the slide seat, the slide jacket sections being slidably fitted with the slide guide sections.

28. The synchronous pull device for slide cover mechanism as claimed in claim 20, wherein each slide seat has two slide jacket sections respectively disposed on two sides of the slide seat, the slide jacket sections being slidably fitted with the slide guide sections.

29. The synchronous pull device for slide cover mechanism as claimed in claim 21, wherein each slide seat has two slide jacket sections respectively disposed on two sides of the slide seat, the slide jacket sections being slidably fitted with the slide guide sections.

* * * * *